US009307489B2

(12) United States Patent
Yerrabommanahalli et al.

(10) Patent No.: US 9,307,489 B2
(45) Date of Patent: Apr. 5, 2016

(54) METHODS AND APPARATUS FOR PREFERRED DATA TRAFFIC (APPLICATION) MODE

(71) Applicant: Apple Inc., Cupertino, CA (US)

(72) Inventors: Vikram B. Yerrabommanahalli, Sunnyvale, CA (US); Arun G. Mathias, Cupertino, CA (US); Matthew S. Klahn, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 154 days.

(21) Appl. No.: 13/772,196

(22) Filed: Feb. 20, 2013

(65) Prior Publication Data

US 2013/0215846 A1    Aug. 22, 2013

Related U.S. Application Data

(60) Provisional application No. 61/600,923, filed on Feb. 20, 2012.

(51) Int. Cl.
*H04W 80/04* (2009.01)
*H04W 88/06* (2009.01)
*H04W 28/04* (2009.01)
*H04W 72/04* (2009.01)
*H04W 36/18* (2009.01)
*H04W 48/18* (2009.01)

(52) U.S. Cl.
CPC .............. *H04W 48/18* (2013.01); *H04W 88/06* (2013.01)

(58) Field of Classification Search
CPC ..... H04W 80/04; H04W 88/06; H04W 28/04; H04W 72/04; H04W 36/18

USPC .......................................... 370/328, 329, 331
See application file for complete search history.

(56) References Cited

U.S. PATENT DOCUMENTS

| 5,933,490 | A  | * | 8/1999 | White et al. .............. 379/221.01 |
| 6,879,600 | B1 | * | 4/2005 | Jones et al. .................... 370/466 |
| 8,195,166 | B1 | * | 6/2012 | Oprescu-Surcobe et al. 455/436 |
| 8,443,083 | B2 | * | 5/2013 | Khushu et al. ................ 709/226 |
| 8,688,160 | B2 |   | 4/2014 | Mujtaba et al. |
| 8,743,852 | B2 |   | 6/2014 | Mujtaba et al. |
| 8,792,888 | B2 |   | 7/2014 | Zhao et al. |
| 8,793,000 | B2 |   | 7/2014 | Mujtaba et al. |
| 8,810,766 | B2 |   | 8/2014 | Dausmann |

(Continued)

FOREIGN PATENT DOCUMENTS

WO    WO 2011122813    *    3/2011    ............ H04W 52/00

*Primary Examiner* — Ronald B Abelson
(74) *Attorney, Agent, or Firm* — Downey Brand LLP

(57) ABSTRACT

Methods and apparatus for preferring connections between networks. In one embodiment, a mobile device is capable of hybrid network operation (e.g. LTE and CDMA 1× operation), allowing the mobile device to be registered to a CDMA 1× network for voice calls while receiving and sending data traffic over a LTE network. However, any data sent by the LTE network may be lost if the data was transmitted during a tune-away to the CDMA 1× network to perform maintenance operations. In one variant, the mobile device can disable the idle voice connection to the CDMA 1× network based on a request from resident applications requiring real-time data streaming, which are more likely to experience data loss. Consequently, potential data loss due to a network tune-away is prevented, thereby improving data performance of the resident applications. In another embodiment, an adaptive transmit receive mode can be selectively disabled/enabled for data traffic.

14 Claims, 6 Drawing Sheets

(56) References Cited

U.S. PATENT DOCUMENTS

| | | |
|---|---|---|
| 8,811,922 B2 | 8/2014 | Mujtaba et al. |
| 8,958,760 B2 | 2/2015 | Mujtaba et al. |
| 9,002,283 B2 | 4/2015 | Mujtaba et al. |
| 9,008,033 B2 | 4/2015 | Su et al. |
| 9,009,320 B2 | 4/2015 | Shi et al. |
| 9,049,745 B2 | 6/2015 | Mujtaba et al. |
| 9,094,928 B2 | 7/2015 | Mathias et al. |
| 2003/0002525 A1* | 1/2003 | Grilli et al. .............. 370/465 |
| 2004/0121778 A1* | 6/2004 | Hunkeler et al. .......... 455/452.2 |
| 2005/0070293 A1* | 3/2005 | Tsukiji et al. ............. 455/452.1 |
| 2007/0097922 A1* | 5/2007 | Parekh et al. .............. 370/332 |
| 2008/0107119 A1* | 5/2008 | Chen et al. ............. 370/395.21 |
| 2008/0280615 A1* | 11/2008 | Vinayakray-Jani .......... 455/437 |
| 2008/0318580 A1* | 12/2008 | Zhong et al. .............. 455/444 |
| 2011/0170495 A1* | 7/2011 | Earnshaw et al. .......... 370/329 |
| 2011/0212747 A1* | 9/2011 | Qin et al. ................. 455/553.1 |
| 2012/0236831 A1* | 9/2012 | Sayeedi et al. ............ 370/332 |
| 2012/0282975 A1 | 11/2012 | Mujtaba et al. |
| 2012/0294173 A1 | 11/2012 | Su et al. |
| 2013/0027678 A1 | 1/2013 | Dausman |
| 2013/0033996 A1 | 2/2013 | Song et al. |
| 2013/0035051 A1 | 2/2013 | Mujtaba et al. |
| 2013/0163536 A1* | 6/2013 | Anderson et al. .......... 370/329 |
| 2015/0023284 A1 | 1/2015 | Zhao et al. |
| 2015/0289286 A1 | 10/2015 | Su et al. |
| 2015/0296483 A1 | 10/2015 | Shi et al. |

* cited by examiner

METHODS AND APPARATUS FOR PREFERRED DATA TRAFFIC (APPLICATION) MODE

PRIORITY AND RELATED APPLICATIONS

This application claims priority to U.S. Provisional Patent Applicant Ser. No. 61/600,923 filed Feb. 20, 2012 of the same title, which is herein incorporated by reference in its entirety.

This application is related to co-owned, co-pending U.S. patent application Ser. No. 13/204,617 filed Aug. 5, 2011, and entitled "ELECTRONIC DEVICE WITH ANTENNA SWITCH CAPABILITIES", Ser. No. 13/640,049 filed Aug. 1, 2011, and entitled "METHODS FOR TRANSMIT ANTENNA SWITCHING DURING UPLINK ACCESS PROBING", Ser. No. 13/195,761 filed Aug. 1, 2011, and entitled "ANTENNA SWITCHING SYSTEM WITH ADAPTIVE SWITCHING CRITERIA", Ser. No. 13/347,925 filed Jan. 11, 2012, and entitled "METHODS FOR COORDINATED SIGNAL RECEPTION ACROSS INTEGRATED CIRCUIT BOUNDARIES", Ser. No. 13/346,419 filed Jan. 9, 2012, and entitled "DYNAMIC TRANSMIT CONFIGURATIONS IN DEVICES WITH MULTIPLE ANTENNAS", Ser. No. 13/195,732 filed Aug. 1, 2011, and entitled "LTE/1x DUAL-STANDBY WITH SINGLE-CHIP RADIO", Ser. No. 13/099,204 filed May 2, 2011, and entitled "SINGLE-RADIO DEVICE SUPPORTING COEXISTENCE BETWEEN MULTIPLE RADIO ACCESS TECHNOLOGIES", Ser. No. 13/099,081 filed May 2, 2011, and entitled "IDLE MODE RECEIVE ANTENNA DIVERSITY SYSTEM", Ser. No. 13/099,204 filed Apr. 22, 2011, and entitled "SINGLE-RADIO DEVICE SUPPORTING COEXISTENCE BETWEEN MULTIPLE RADIO ACCESS TECHNOLOGIES", and co-owned, U.S. Provisional Patent Application Ser. Nos. 61/488,649 filed on May 20, 2011, and entitled "APPARATUS AND METHODS FOR CLIENT SERVER INTERACTION IN HYBRID NETWORK ENVIRONMENTS", 61/488,663 filed on May 20, 2011, and entitled "APPARATUS AND METHODS FOR OPTIMIZING SCHEDULED OPERATIONS IN HYBRID NETWORK ENVIRONMENTS", 61/488,620 filed May 20, 2011, and entitled "APPARATUS AND METHODS FOR NETWORK ASSISTED HYBRID NETWORK OPERATION", 61/478,922 filed Apr. 25, 2011, and entitled "DUAL NETWORK MOBILE DEVICE RADIO RESOURCE MANAGEMENT", 61/472,617 filed Apr. 6, 2011, and entitled "MULTIPLE NETWORK MOBILE DEVICE CONNECTION MANAGEMENT", 61/433,160 filed Jan. 14, 2011, and entitled "DYNAMIC LOADING IN DEVICES WITH MULTIPLE ANTENNAS", and 61/433,162 filed Jan. 14, 2011, and entitled "MULTIMODE USER EQUIPMENT WITH DUAL CIRCUIT ARCHITECTURE", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present disclosure relates generally to operation within heterogenous wireless systems such as, for example, hybrid network operation in which client devices can communicate using any one or more of several networks or access technologies. More particularly, in one exemplary case, the present disclosure is directed to methods and apparatus for enabling a preferred data traffic mode on client devices based on application needs.

2. Description of Related Technology

A cellular network operator provides mobile telecommunications services to the public via a network infrastructure of e.g., cellular base stations (BS), base station controllers, infrastructure nodes, etc. There is a wide variety of cellular network technologies, and historically cellular devices have been specialized for operation within a single cellular network. However, as cellular technologies have become increasingly commoditized, devices are now able to offer so-called "multimode" operation; i.e., a single device that is capable of operation on two or more cellular or other wireless networks. Multimode operation allows a device to operate on any one of several network technologies, but does not enable operation on multiple network technologies simultaneously.

Incipient research is directed to so-called "hybrid" network operation. During hybrid network operation, the client device operates simultaneously among multiple distinct networks having different technologies. In one exemplary case, a hybrid device can support both: (i) Long Term Evolution (LTE) and (ii) Code Division Multiple Access 1x (CDMA 1x) networks; i.e., the device can maintain a simultaneous connection between an LTE network and a CDMA 1x network. For example, a LTE/CDMA 1x switched mode device can conduct a voice call over the CDMA 1x network, while the mobile device is in LTE mode for data services. In another exemplary case, a hybrid device can support both: (i) CDMA 1x-EVDO (Evolution Data Optimized) and (ii) CDMA 1x networks.

Existing solutions for hybrid network operation rely on the client device to manage its own operation between networks. Specifically, the client device is responsible for maintaining its active connections to the various service networks; there are no required changes to existing network installations (i.e., hybrid network operation does not affect the legacy hardware and software of the network infrastructure). Client-centric hybrid operation has several benefits. For example, there is very little (if any) infrastructure cost for the network operator. Moreover, hardware costs can be incorporated into the price of consumer devices. Additionally, hybrid network operation will not affect existing legacy devices. Similarly, devices capable of hybrid or switched mode operation are also capable of normal operation.

However, a mobile device may share antenna resources for the hybrid network operation, which can cause problems. For example, while a mobile device is attached to a first LTE network, it must periodically tune-away from the LTE network to perform CDMA 1x actions (such as decoding the Quick Paging Channel (QPCH) or Paging Channel (PCH) to determine if the device is being paged). If the mobile device is receiving data from the LTE network during the tune out period, this data is lost. This loss of data can negatively impact the performance of applications running on the mobile device, especially applications sensitive to data loss (e.g. real-time applications).

Consequently, improved methods and apparatus are needed for reducing data loss or other adverse consequences of hybrid network operation.

SUMMARY

The present disclosure satisfies the aforementioned needs by providing, inter alia, improved apparatus and methods for prioritizing connections between networks.

A method for prioritizing connections of a mobile device between networks is disclosed. In one embodiment, the method includes: monitoring a parameter indicative of a preferred connection setting between two or more networks; determining based on the parameter when a change has been indicated; and updating the preferred connection setting based at least in on the determination.

In one variant, the method further includes the mobile device modifying one or more connections between the two or more networks based at least in part on the updated preferred connection setting.

In a second embodiment, the method includes receiving a notification from a mobile device, the notification includes at least a request based at least in part on a desired prioritized network connection, and adjusting one or more parameters relating to scheduled communications with the mobile device at least partly in response to the received notification.

A mobile device having preferred connection management is disclosed. In one embodiment, the mobile device includes a processor, two or more wireless interfaces in data communication with the processor, and logic in data communication with the processor and two or more wireless interfaces.

In one variant, the logic is configured to monitor one or more operational conditions of the mobile device, detect a change in the one or more operational conditions, determine when a change to a connection configuration of the at least one of the two or more wireless interfaces is desired, and update the connection configuration based at least in part on the determination.

A non-transitory computer readable apparatus configured for use in a mobile device is disclosed. In one embodiment the computer readable apparatus includes a plurality of instructions that when executed by a digital processor, monitors a parameter indicative of a preferred connection setting between two or more networks, determines based on the parameter when a change has been indicated, and updates the preferred connection setting based at least in part on the determination In a second embodiment the non-transitory computer readable apparatus is configured for use in a base station, the computer readable apparatus includes a plurality of instructions that when executed by a digital processor, receives a notification from a mobile device, the notification comprising at least a request based at least in part on a desired prioritized network connection, and adjusts one or more parameters relating to scheduled communications with the mobile device at least partly in response to the received notification.

An integrated circuit (IC) is disclosed. In one embodiment, the IC comprises circuit logic which is configured to implement the prioritization of connection between networks.

A wireless system is disclosed. In one embodiment, the system includes a plurality of base stations and a plurality of mobile user devices. The mobile user devices are configured to implement prioritized connections between the plurality of base stations.

A network apparatus capable of facilitating prioritized network connections with mobile devices is disclosed. In one embodiment, the base network apparatus includes a processor, at least one wireless interface in data communication with the processor, logic in data communication with the processor and the at least one wireless interface.

In one variant the logic configured to receive a notification from the mobile device via the at least one wireless interface, the notification comprising at least a desired prioritized network connection setting, determine based at least in part on the desired prioritized network connection setting, and based at least in part on the determination, adjust one or more parameters relating to scheduled communication with the mobile device.

A method of selectively enabling and disabling an adaptive transmit receive diversity (ATRD) mode is disclosed.

Other features and advantages of the present disclosure will immediately be recognized by persons of ordinary skill in the art with reference to the attached drawings and detailed description of exemplary embodiments as given below.

All Figures © Copyright 2012 Apple Inc. All rights reserved.

DETAILED DESCRIPTION

Reference is now made to the drawings, wherein like numerals refer to like parts throughout.

Overview

Various embodiments described herein provide, inter alia, apparatus and methods for a client device to prioritize connection modes in a hybrid network. In one exemplary embodiment, a UE operating in CDMA 1× and LTE networks can enable and disable connection to the CDMA 1× network so as to minimally affect LTE network operation.

For example, as described in greater detail hereinafter, a switched mode UE can selectively disable a CDMA 1× connection used for voice when running applications which are more susceptible to data loss, such as Voice over Internet Protocol (VoIP) and video conferencing, which utilize real-time data streaming. By disabling the CDMA 1× connection, maintenance operations for the CDMA 1× channel are not performed, thereby freeing antenna resources for the LTE data connection, thus mitigating possible data packet loss over the LTE connection.

Various other embodiments of the present disclosure are described in greater detail hereinafter.

DETAILED DESCRIPTION OF EXEMPLARY EMBODIMENTS

Exemplary embodiments are now described in detail. While these embodiments are primarily discussed in the context of Long Term Evolution (LTE), Time-Division LTE (TD-LTE), Code Division Multiple Access 1× (CDMA 1×) cellular networks, CDMA 1×EVDO (Evolution Data Optimized), Time-Division Synchronous CDMA (TD-SCDMA), and Global System for Mobile Communications (GSM), it will be recognized by those of ordinary skill that the present disclosure is not so limited. In fact, the various principles described herein are useful in combination with any network (cellular, wireless, wireline, or otherwise) that can benefit from enabling a preferred data traffic mode.

Moreover, it will be appreciated that while exemplary embodiments of the apparatus and methods are described in terms of disabling a network connection e.g., a network connection handling voice calls (e.g., CDMA 1×) so as to mitigate or eliminate the effects on a data connection over another network (e.g., LTE): (i) these roles may be reversed (e.g., some LTE network tasks can be disabled so as to minimize impact on the CDMA 1× network); and (ii) a cooperative approach may be implemented (e.g., where both networks receive prioritized connections so as to minimize impact on both networks).

LTE/CDMA 1× Switched Mode Network Operation—

Figure 1:
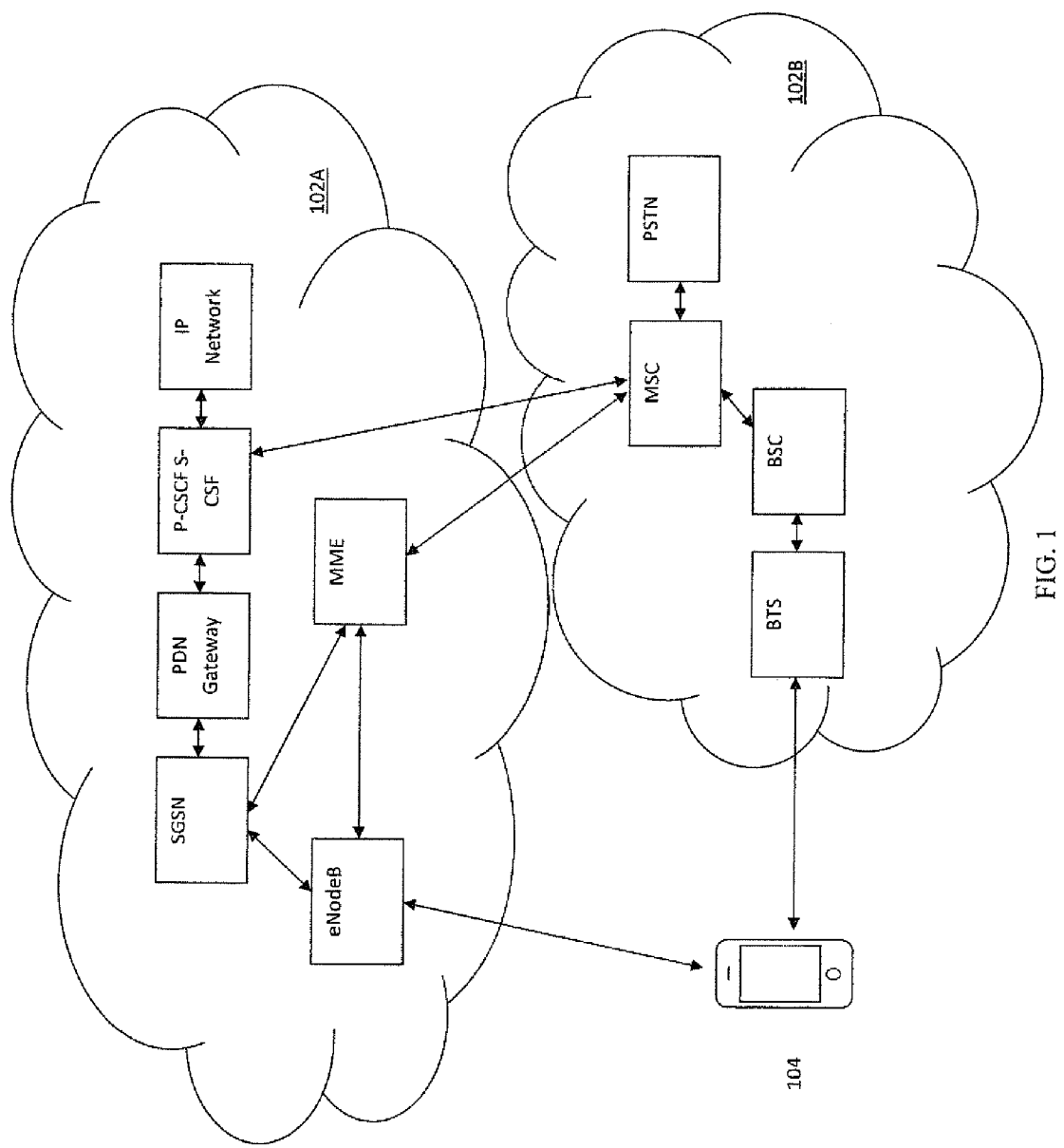
FIG. 1 is a logical block diagram illustrating one exemplary hybrid network system useful in conjunction with the present disclosure.

FIG. 1 illustrates an exemplary hybrid network system 100. The exemplary hybrid network comprises a first LTE RAN (radio access network) 102A and a second CDMA 1×RAN 102B in communication with a user equipment (UE) client device 104. As shown in FIG. 1, the LTE RAN and CDMA 1×RAN are unsynchronized, and entirely unaware of the other RAN's operation. In other scenarios, the RANs may have higher levels of coordination; e.g., the RANs may be loosely synchronized, or even tightly synchronized in certain elements of their operation.

During LTE/CDMA 1× switched mode operation, the UE 104 can place CDMA 1× voice calls while registered with the LTE network. The UE is capable of receiving and responding to data and control messaging from either the LTE network or the CDMA 1× network; unfortunately, the UE in this scenario cannot respond simultaneously to both networks. In one such embodiment, the UE always prioritizes CDMA 1× (voice call) traffic over LTE (data) traffic to ensure that user experience for voice calls is unaffected. Other implementations may have other prioritization schemes (e.g., where voice calls are lower priority, based on the type of traffic, historic device usage, etc.).

Within this context, many operations can be greatly affected by the UE switching. For example, as described in co-owned and co-pending U.S. Provisional Patent Application Ser. No. 61/488,649 filed on May 20, 2011, and entitled "APPARATUS AND METHODS FOR CLIENT SERVER INTERACTION IN HYBRID NETWORK ENVIRONMENTS", incorporated herein by reference in its entirety, maintenance tasks that are interrupted can introduce data corruptions and/or errors which can contribute to highly undesirable behavior (e.g., networks being barred, devices being improperly managed, etc.). While the foregoing disclosure provides methods and apparatus for modifying network management for hybrid operation, further improvements to client device operation so as to alleviate data traffic loss may be useful.

In particular, once the UE 104 has connected to the LTE network 102A, the UE will periodically tune its radio away from the LTE network to perform CDMA 1× maintenance actions such as, for example, acquiring a CDMA 1× cell, registering to the acquired CDMA 1× cell, and receiving CDMA 1× pages, etc. Depending on CDMA 1× network 102B radio conditions, the tune-away in one exemplary implementation may last from thirty milliseconds (30 ms) up to three-hundred milliseconds (300 ms) in ideal conditions. Therefore any data sent by the LTE network 102A during this time period will be lost. Moreover, when the UE receives or places a voice call on the CDMA 1× network, the LTE connection may be dropped.

Various embodiments of the present disclosure prioritize connections with a first network over connections with a second network to improve operation of the first network. For example, CDMA 1× may have its tune-away procedure disabled to improve LTE operation. Accordingly, the client device can increase hybrid network data performance by ensuring that various CDMA 1× tasks are delayed or the periodicity may be increased in multiples or completely avoided during particular LTE network operation.

TD-LTE/GSM Network Operation—

As is understood in the art, Global System for Mobile Communications (GSM) is a cellular technology standard and has evolved a number of advancements including General Packet Radio Service (GPRS), Enhanced Data rates for GSM Evolution (EDGE), and Universal Mobile Telecommunications System (UMTS) also known as 3G (Third Generation) UMTS.

In an exemplary embodiment relating to both TD-LTE and GSM, a UE operating in a switched mode connection to the TD-LTE network will periodically tune its radio away from the TD-LTE network to perform GSM actions such as cell selection, registration, and receiving pages. Likewise, a UE may be operating in an adaptive receive transmit diversity (ATRD) mode with any of the aforementioned cellular networks thereby improving transmit signal quality.

Methods—

Figure 2:
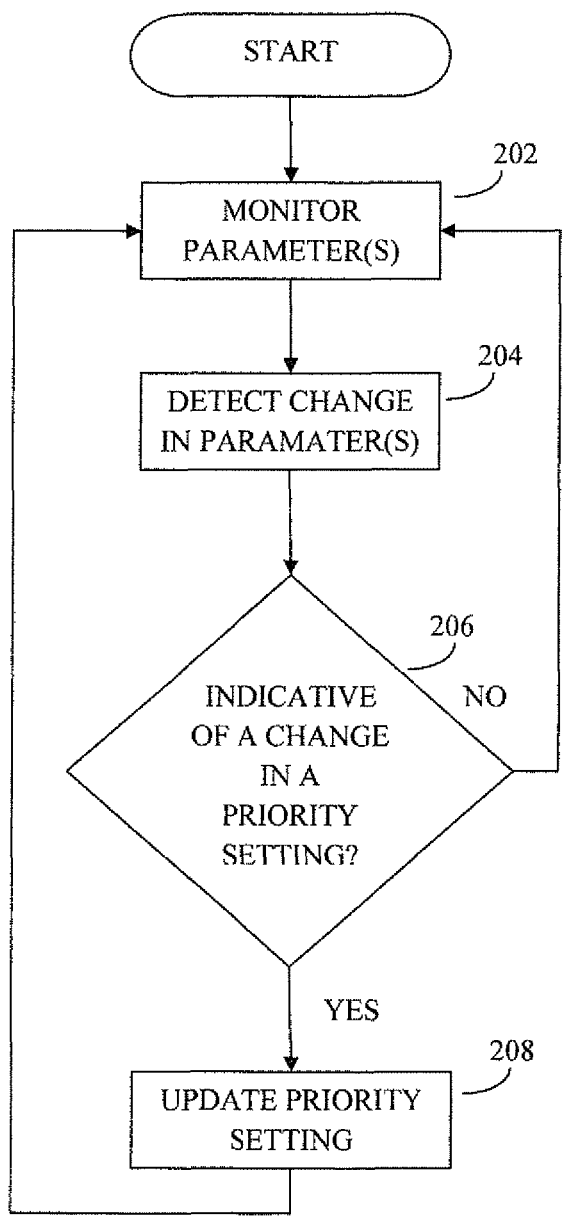
FIG. 2 is a logical flow diagram illustrating one embodiment of the generalized method for selecting a particular network connection over another network connection.

Referring now to FIG. 2, one embodiment of a generalized method 200 for selecting a particular network connection over another network connection is illustrated. In one implementation, an exemplary client device maintains connections to multiple networks, where the networks are entirely unaware of the client device's connection to the other networks, and thus are unable to coordinate their transmissions. In another variant, the client device is capable of communicating with a network using an adaptive transmit receive diversity (ATRD) mode, discussed in more detail below with respect to FIG. 2a.

At step 202, the client device monitors one or more parameters. In one embodiment, the monitored parameters relate to applications resident to the client device. In one variant, the applications include indicators indicative of a desired network mode setting. For example, an application may include an indicator which specifies a preferred data traffic mode requesting that the client device give higher priority to the data network connection over a voice network connection. In one implementation, the indicators are set by the application designer or a third-party. In another implementation, the indicators are determined by a modifiable setting selectable by a user of the exemplary client device (or by automated selection logic, such as via a supervisory process running on the device or in a remote entity). Common examples of indicators include interrupts, flags, variables, etc.

In another embodiment, the monitored parameters relate to voice and data traffic parameters at the client device. In one implementation, the client device monitors the type of data traffic being received and/or transmitted by the client device. For example, in the instance of Internet Protocol (IP) data traffic, the Differentiated Services Code Point (DSCP) field or the flow label field of incoming IP packet headers may be monitored as an indication of a need for a low-latency connection and/or a particular sensitivity to packet loss.

In another variant, the client device monitors the types of files being sent or received. In yet another implementation, the amount of data flow being transmitted or received by the device is monitored.

Additionally, in one variant, the client may also provide an API for the applications to invoke the usage of the parameter.

At step 204 of the method, the client device detects a change in the parameters. In one embodiment, the detected change is the initialization or termination of an application by the client device. In another embodiment, the detected change is a variation in the amount of received and/or transmitted data traffic at the client device. In one variant, the change in data traffic is determined on the change of type of data traffic being sent or received. Alternatively, the change in data traffic can be based on a sufficiently large change in the data flow being transmitted and/or received at the client device.

At step 206, the detected change of the monitored parameter(s) is evaluated to determine if the detected change is indicative of a change in a priority setting. In one embodiment, a detected change in running applications is evaluated to determine if the initialized or terminated application contained an indicator of a preferred network setting. For example, an application may have been initialized where the application contained an indicator requesting the client device to give priority to operating data traffic over voice traffic. In this instance, the indicator is interpreted as a request to give priority to a data traffic mode. On the other hand, if the application is being terminated, the application may indicate no longer needing or requiring priority to a data traffic mode.

In another embodiment, the change in the type of data being received and/or transmitted is evaluated to determine if the type of data is indicative of a preferred connection setting. For example, in one implementation, if the type of data is of a type related to real-time data streaming (e.g. voice over IP (VOIP), video conference stream, etc.), that type of data is taken as a signal to request an assigned higher priority to the data network connection of the client device over the voice network connection.

In yet another implementation, the data flow is measured for sufficient increases or decreases in data flow indicative of an increasing or decreasing importance of the connection to the network handling the data network compared to the network handling the voice connection.

At step 208 of the method, the priority setting is updated in accordance with the determination made in step 206. In one embodiment, the priority setting which is updated is a preferred data mode, which enables or disables a network connection used for voice calls in order to maximize resources for a network connection used for a data. In one exemplary variant, the connection to the CDMA 1× network used for voice is not completely disabled, but instead performs a tune-away to the CDMA 1× connection from the LTE connection less frequently (e.g., at a reduced frequency, or on an event-driven basis). By still maintaining network tune-away, maintenance operations are still performed on the voice connection while still enabling the monitoring of the Quick Paging Channel (QPCH) or Paging Channel (PCH) for incoming calls and overhead updates.

In another implementation, the client device notifies the CDMA 1× network of the change in the priority setting so that the CDMA 1× network and client device may coordinate maintenance operations and paging schedules, or to indicate that the client device will unavailable to receive incoming voice calls. After the priority setting update has been performed, the method proceeds back to step 202 to continue monitoring the parameter(s). In one embodiment, the client device performs configuration changes in accordance with the updated priority setting before returning back to step 202.

Figure 2A:
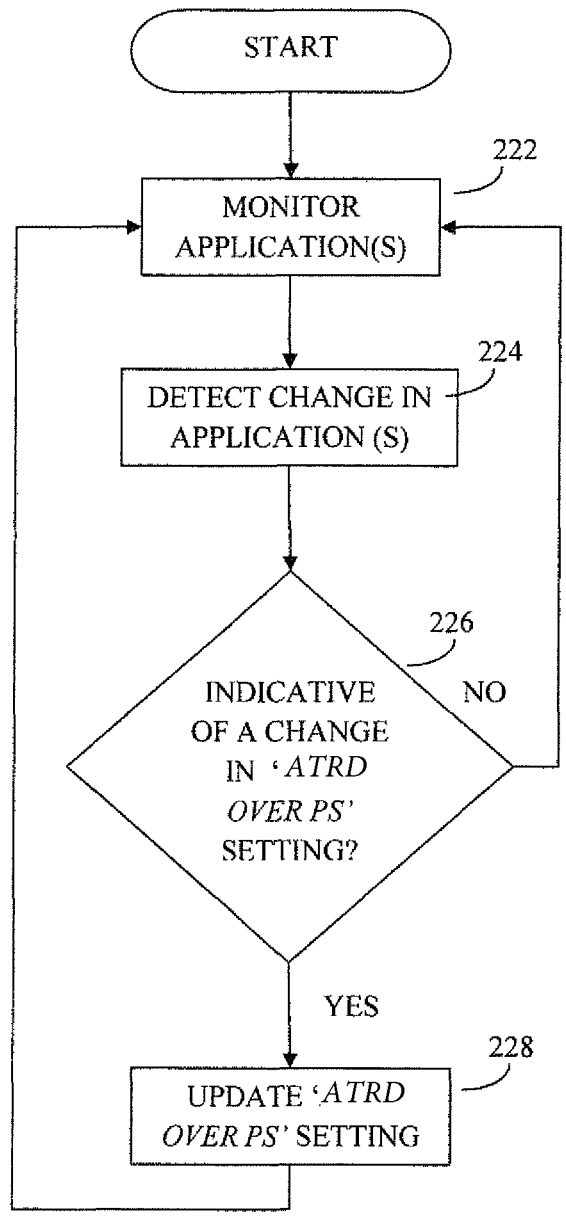
FIG. 2a is a logical flow diagram detailing one exemplary implementation of the generalized method of FIG. 2 in the context of operating data communications between a mobile device and a network using an adaptive transmit receive diversity (ATRD) mode.

FIG. 2a illustrates a specific exemplary implementation of the generalized method 200 of FIG. 2. The exemplary mobile device of FIG. 2a is able to operate using adaptive transmit receive diversity (ATRD) as described in co-owned and co-pending U.S. patent application Ser. No. 13/204,617 filed Aug. 5, 2011, and entitled "ELECTRONIC DEVICE WITH ANTENNA SWITCH CAPABILITIES", Ser. No. 13/640,049 filed Aug. 1, 2011, and entitled "METHODS FOR TRANSMIT ANTENNA SWITCHING DURING UPLINK ACCESS PROBING", Ser. No. 13/195,761 filed Aug. 1, 2011, and entitled "ANTENNA SWITCHING SYSTEM WITH ADAPTIVE SWITCHING CRITERIA", each of the foregoing being incorporated herein by reference in its entirety. In one exemplary embodiment, a mobile device implementing ATRD operates using two antennas, A0 and A1. A0 is the primary antenna which is responsible for the transmit channel (TX) and well a first receive channel (R0). The secondary antenna is responsible for a second receive channel (R1). One particular advantage of implementing ATRD is that the receive channels R0 and R1 can be monitored for their respective receive signal qualities. The receive channel quality provides a good estimation of the transmit signal quality as the receive signal and the transmit signal will follow roughly the same transmission path. Thus, the antenna operating the RX channel with the best signal quality will most likely provide the best signal quality of the TX channel. Therefore, if the TX function can be selectively allocated to the antenna displaying the best receive quality, the transmit signal quality may be improved.

In one exemplary implementation of ATRD, the TX will change from antenna A0 to A1, or vice versa, depending on which antenna is demonstrating a sufficiently high RX channel receive quality as compared to the other RX channel. However, the RX channel signal quality can only be measured during periods which transmissions are received. Therefore, in periods when the RX channels are not receiving transmission traffic, it is more difficult to determine which antenna provides the best potential transmit signal quality. Thus, ATRD is typically most effective in situations where receive transmissions are continuous, such as with voice traffic. Accordingly, ATRD may be less effective in situations where receive transmission may be more intermittent, such as packet-switched data traffic, which may be sent in bursts with time gaps between receive signals.

One salient advantage of the described embodiments is that if data traffic is predicatively constant, ATRD can be used over packet-switch connections to improve transmit signal quality. For example, applications utilizing the reception of real-time data streams can provide a continual receive channel quality akin to voice traffic. In addition, applications which also utilize real-time data streaming in the upstream (i.e., transmit) channel, such as VoIP and video conference may gain improvements in the data transmit performance.

At step 222, the mobile device monitors the software environment of the device for any applications that are initialized and/or terminated. In one embodiment, the applications can be enabled to contain a marker requesting that a setting labeled 'ATRD over PS' (Adaptive Transmit Receive Diversity over Packet-Switched) be set to 'On'. In one implementation, the marker may be a user driven setting per application or an autonomous setting provided to application via application programming interfaces (API). By requesting that 'ATRD over PS' be set to 'On', the application is signaling that it may benefit from ATRD for data traffic operation. When the 'ATRD over PS=Off', the ATRD for packet-switched connections is not active, and instead packet-switch transmit and receive operations are handled, in one exemplary variant, in accordance with a "best effort" traffic implementation. Upon detecting a change in the applications which are running on the mobile device, the mobile proceeds to step 224.

At step 224, the mobile device detects a change in the applications running on the resident device. For example in one embodiment, a user of the UE may have initialized or terminated an application on the device. A change in what applications are actively running on the mobile device is indicative of a potential need to update the 'ATRD over PS' setting.

At step 226, the mobile determines if the detected change is representative of the change in the 'ATRD over PS' setting. In one embodiment, a newly initialized application may have contained a marker to set 'ATRD over PS=On'. If the 'ATRD over PS' setting is currently set to 'Off', the mobile device interprets the request to 'On' an indicative change in the desired 'ATRD over PS' setting.

Additionally an application may have been terminated, which had previously signaled a request for 'ATRD over PS=On'. If the 'ATRD over PS' is currently set to 'On', and no other currently applications have requested that 'ATRD over PS=On', the mobile device interprets the detected termination of the application as a signal that 'ATRD over PS' can be set to 'Off', and that data utilization of the ATRD data traffic mode may no longer be required and/or be of a significant benefit. In one variant, the mobile device may ignore the signal to update the 'ATRD over PS' setting upon a determination that modifying the RX/TX mode (i.e. to enable/disable ATRD) is not appropriate under the operating circumstances.

At step 228, the mobile device updates the 'ATRD over PS' setting in accordance with the determination made in step 226. In one embodiment, the 'ATRD over PS' setting is maintained by the operating system of the mobile device. The operating system updates 'ATRD over PS' setting and proceeds to notify the processing element responsible for managing the ATRD connection mode. After the 'ATRD over PS' setting is updated, the mobile device returns to step 222 to continually monitor the running application(s). In one implementation, prior to returning back to step 222, the mobile device will modify operation of RX/TX mode in accordance with the updated 'ATRD over PS' setting.

Example Operation

Figure 3:
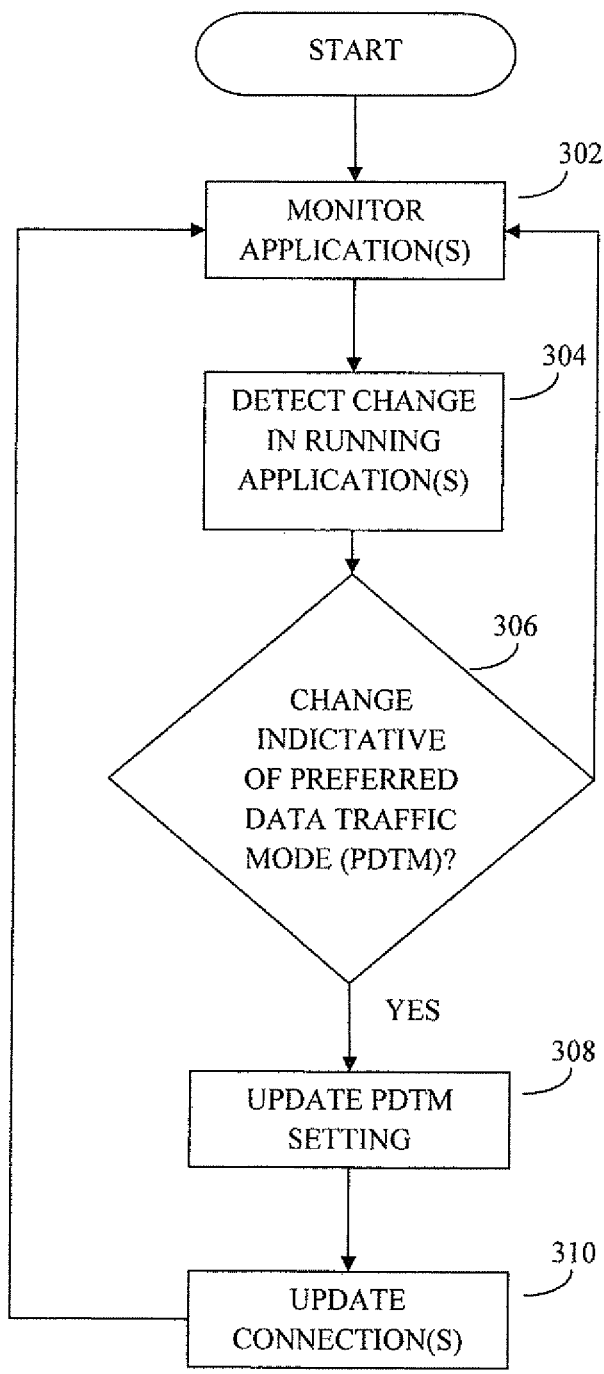
FIG. 3 is a logical flow diagram detailing one embodiment of the generalized method of prioritizing network connections of client device between a Long Term Evolution (LTE) network and Code Division Multiple Access 1× (CDMA 1×) network.

Referring now to FIG. 3, one exemplary implementation of the generalized method 300 is shown and described, specifically in the context prioritizing network connections of client device between a Long Term Evolution (LTE) network and Code Division Multiple Access 1× (CDMA 1×) network. In one embodiment, an exemplary LTE/CDMA 1× user equipment (UE) device is capable of executing a variety of real-time streaming applications (e.g. video conferencing, Voice over IP, etc.).

At step 302, the UE monitors the device for any applications that are initialized and/or terminated on the UE. In one embodiment, the monitoring is performed by software executed by an application processor of the UE. The applications can be enabled to contain an indicator requesting that a setting, such as one labeled "Preferred Data Traffic Mode" (PDTM), be set to "On". The indictor may be a user driven setting per application or an autonomous setting provided to application via an external entity through an application programming interface (API). By requesting that 'PDTM' be set to "On", the application is indicating that the LTE/CDMA 1× switched mode can be disabled. The switched mode is disabled by only continuing to operate the network responsible for data traffic, in this instance the LTE network connection. Accordingly, the CDMA 1× connection is disabled thereby obviating the need to perform tune-away to the CDMA 1× network to perform maintenance operations, and listen for paging requests. Upon detecting a change in the applications which are running on the UE, the UE proceeds to step 304 to determine if the detected change is indicative of a change in the prioritization of data usage on the device.

As a brief aside, applications which are sensitive to packet loss such as real-time data streaming applications would benefit particularly from the 'PDTM'. For example, applications offering voice servicing such as VoIP and video conferencing, such as the exemplary FaceTime video calling software, may operate by using real-time data streams. As real-time data streams are received at the device on a continual basis, the likelihood of losing data from a CDMA tune-away is high and would negatively affect the application's performance. Therefore, disabling the CDMA connection on the UE prevents any related data loss that would be attributable to a potential tune-away to the CDMA network. Furthermore, the impact of losing the voice traffic connection to the CDMA 1× network is mitigated, as the user may be implementing voice services through the real-time applications.

At step 304, the UE detects a change in the application running on the resident device. For example, a user of the UE may have initialized or terminated an application on the device. A change in the applications that are actively running on the UE can indicate of a potential need to update the 'PDTM' setting as there may be a need to reinitialize hybrid mode operation, to receive any potential voice traffic, or to disable the hybrid mode operation to mitigate potential loss of data traffic.

At step 306, the UE determines if the detected change is indicative of the change in the 'PDTM' setting. For example, a newly initialized application contain an indicator to set 'PDTM=On'. If the 'PDTM' is currently set to 'Off', the UE interprets the request to 'On' an indicative change in the desired 'PDTM' setting. However, such a request may be denied by the UE. For instance, if the UE is actively receiving and/or sending voice traffic, the UE may not wish to disable the connection to the network handling the voice connection as the voice traffic would be terminated.

Additionally, an application may be terminated which had previously indicated a request for 'PDTM=On'. If the 'PDTM' is currently set to 'On', and no other currently applications have requested flagged that 'PDTM' be set to 'On', the UE interprets the termination of the application as an indication that 'PDTM' may be set to 'Off', and that hybrid mode operation can be reinstated so the UE can reconnect to a voice network connection.

At step 308, the UE updates the 'PDTM' setting in accordance with the determination made in step 306. In one embodiment, the 'PDTM' setting is maintained by the operating system of the UE. The operating system updates 'PDTM' setting and proceeds to notify the processing element responsible for managing the UE's network connections.

At step 310, the connection(s) are updated in accordance with the 'PDTM' setting. In one embodiment, the application processor passes the 'PDTM' setting to the baseband processor responsible for managing the UE's radio connections (e.g.

CDMA 1x, LTE, etc.). For example, the baseband processor(s) of a UE capable of LTE/CDMA 1x hybrid mode is responsible for managing the LTE (i.e. data) connection in addition to the CDMA 1x (i.e. voice) connection. If the baseband processor receives a 'PDTM=On', the baseband processor will disable the hybrid mode and discontinue operation of the CDMA 1x connection while performing any requisite signaling to the CDMA 1x network. Alternatively, if the baseband processor receives a 'PDTM=Off', the baseband processor will reinitialize the hybrid mode operation of the UE and reconnect to a CDMA 1x network. After network connection(s) have been updated, the UE proceeds back to step 302 to monitor applications for any possible requested changes to the 'PDTM' setting.

Apparatus

Exemplary User Equipment Apparatus

Figure 4:
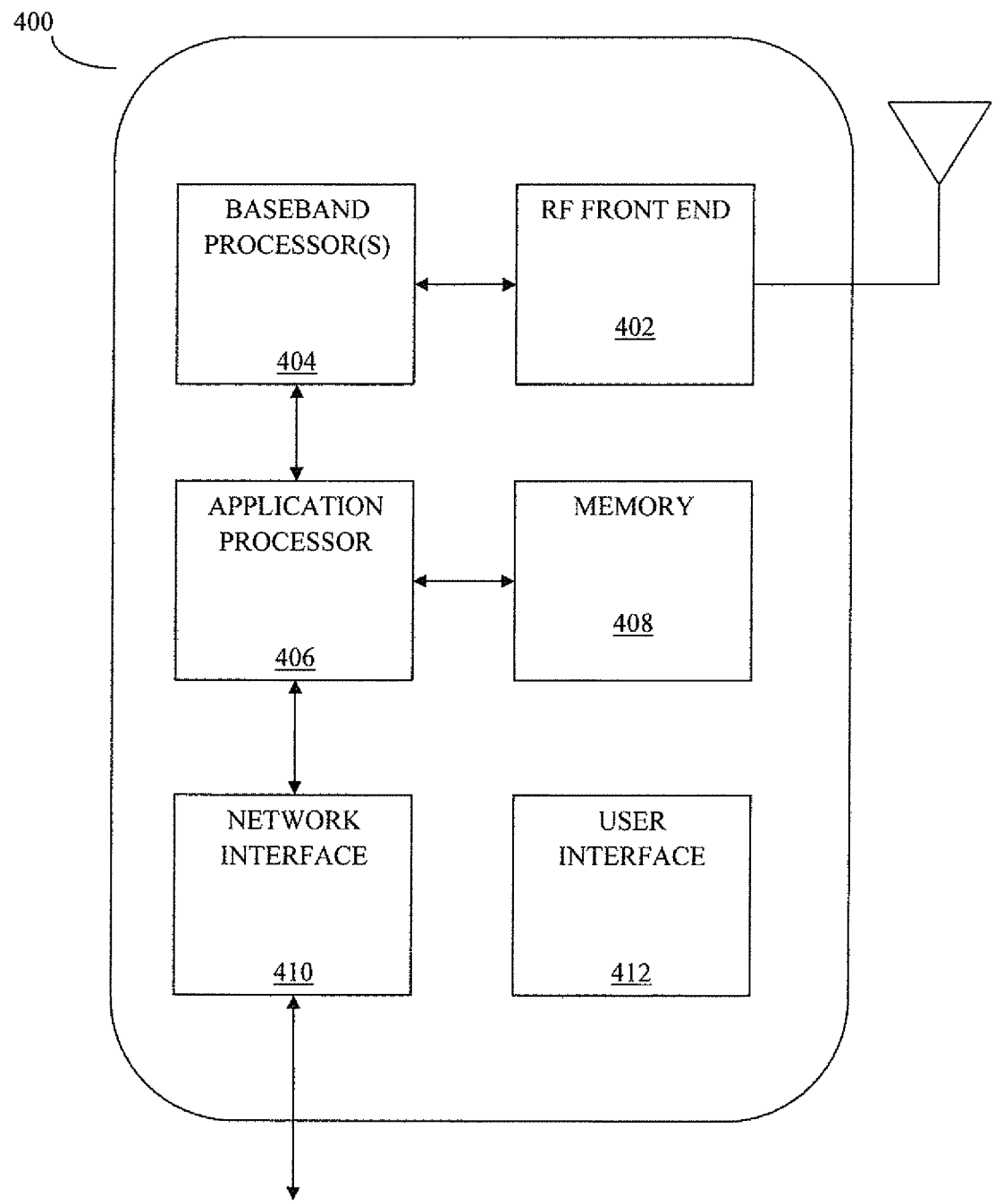
FIG. 4 is a functional block diagram of an exemplary embodiment of a user equipment (UE) apparatus configured according to the present disclosure.

Referring now to FIG. 4, the exemplary user equipment (UE) apparatus 400 is illustrated in greater detail. The UE includes: (i) one or more Radio Frequency (RF) front-ends 402, (ii) one or more baseband processors 404, and (iii) at least one application processor 406, associated memor(ies) 408, various network interface(s) 410, and a user interface 412. In various implementations, the RF front-ends and baseband processors may be further specialized to handle a single wireless technology, or generalized/multi-purposed to encompass multiple wireless technologies.

As shown, the exemplary UE includes a first RF front-end that is coupled to both first and second baseband processors adapted to interface to different networks; e.g., an LTE network and a CDMA 1x network, respectively. It is further appreciated that the foregoing configuration is purely illustrative, and various implementations may include other cellular technologies such as GSM, GPRS, EDGE, WCDMA, CDMA2000, CDMA 1xEVDO, TD-SCMDA, LTE-A (LTE Advanced), TD-LTE, WiMAX (802.16), etc. in various combinations.

Moreover, while only a single RF front-end is shown for simplicity, it is appreciated that a RF front-end can (and generally will) include multiple receive and/or transmit antennas and/or chains. For example, well known MIMO (Multiple In Multiple Out), SISO (Single In Single Out), MISO (Multiple In Single Out), and SIMO (Single In Multiple Out) antenna configurations are widely used within the related arts, and may be used consistent with the present disclosure.

Additionally, in one exemplary embodiment of the present disclosure, the UE 400 RF-front end 402 further comprises a switching fabric that can connect any one (or more) of the baseband processors 404 to various one (or more) of the antennas 402. In one implementation, the switching fabric is adapted to connect either the LTE baseband or CDMA 1x baseband to the RF front-end. However, common embodiments may connect one baseband processor to one antenna ("one-to-one"), one-to-many, many-to-one, etc. This "switching" capability is desirable for a number of reasons, including for example: (i) power management, (ii) processing efficiency/flexibility, and (iii) antenna isolation constraints that may require that only a subset of radios of a mobile device are active at any one time. In some small form factor designs, there is not enough space to completely isolate multiple antennas during operation; consequently, only one antenna can be active at any time. Similarly, certain form factor designs may reuse antennas for different wireless interfaces, such that only one wireless interface can use a common antenna at any given time. Yet other motivations will be appreciated by those of ordinary skill in the related arts, and are not discussed further herein (e.g., business or profit considerations, network utilization, etc.)

Moreover, it will be appreciated that other components are commonly incorporated within UE 400, but are not discussed further herein. For example, the UE may include user interface 412 components (display screens, buttons, touch screens, dials, etc.), memory components (e.g., RAM (Random Access Memory), Flash, hard disk drives (HDD), etc.), power management components (e.g., batteries, charger components, etc.), and external interfaces (e.g., Fire Wire™, Universal Serial Bus™ (USB), Thunderbolt, etc.).

Furthermore, it should be recognized that the UE depicted in FIG. 4 is merely illustrative of one exemplary embodiment. Still other variants useful with the present disclosure are described with greater detail in co-owned and co-pending U.S. Provisional Patent Application Ser. Nos. 61/478,922 filed Apr. 25, 2011, and entitled "DUAL NETWORK MOBILE DEVICE RADIO RESOURCE MANAGEMENT", 61/472,617 filed Apr. 6, 2011, and entitled "MULTIPLE NETWORK MOBILE DEVICE CONNECTION MANAGEMENT", 61/433,160 filed Jan. 14, 2011, and entitled "DYNAMIC LOADING IN DEVICES WITH MULTIPLE ANTENNAS", and 61/433,162 filed Jan. 14, 2011, and entitled "MULTIMODE USER EQUIPMENT WITH DUAL CIRCUIT ARCHITECTURE", and co-owned and co-pending U.S. patent application Ser. No. 13/099,204 filed May 2, 2011, and entitled "SINGLE-RADIO DEVICE SUPPORTING COEXISTENCE BETWEEN MULTIPLE RADIO ACCESS TECHNOLOGIES", each of the foregoing being incorporated herein by reference in its entirety.

The baseband processors 404 are connected to at least one of the application processors 406 enabling communication between each other. In typical implementation, the application processor 406 can only communicate with a limited command set in an effort to enhance security of the baseband processor 404 thereby enhancing the security of communication between the baseband processor and a particular cellular network.

In one embodiment of the present disclosure, the application processor 406 can communicate a preferred data traffic connection mode command directly to the baseband processor 404. In one implementation, upon receiving the preferred data traffic connection mode command, the baseband processor(s) can enable or disable the hybrid mode, the hybrid mode being concurrent registration to both a CDMA 1x network for voice traffic and a LTE network for data traffic. The use of the preferred data traffic connection mode command to disable the hybrid mode will cause the appropriate baseband processor 404 to terminate the voice traffic connection (e.g. CDMA 1x), while continuing to maintain the data connection to the LTE network. By terminating the voice traffic connection, the baseband processor 404 will no longer need to tune-away from the network handling the data traffic to the network handling the voice traffic. Thus, data sent by the data network (e.g. LTE) will not be lost if sent during the tune-away period. The application processor 406, upon a determination that the preferred data traffic connection mode is no longer required and/or desired, the application can instruct the baseband processor 404 to reinstate hybrid mode operation.

In another implementation, the baseband processor(s) 404 can enable or disable an ARTD mode of one or more of the network interfaces 410 maintaining a data connection (e.g. LTE) in response to the preferred data traffic connection mode command. By appropriately enabling the ARTD on the network interface 410 with the packet switched connection, the UE 400 can monitor the receive quality on the packet switched connection, in addition to a possible circuit-switched connection, in order to determine the network interface 410 with the best transmit quality when making a determination on which network interface 410 to be used for transmission.

Exemplary Network Apparatus

Figure 5:
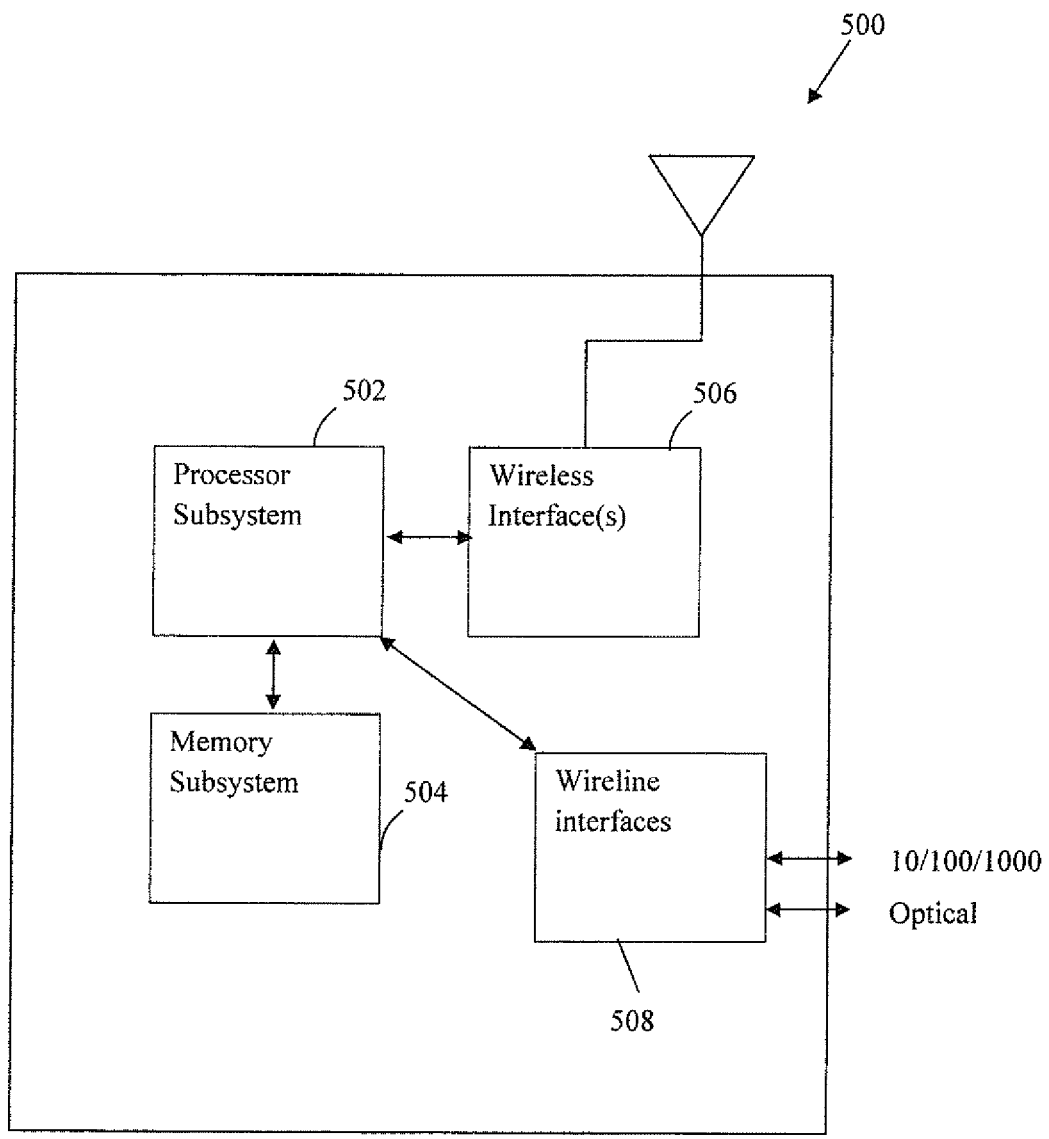
FIG. 5 is a functional block diagram of an exemplary embodiment of a network apparatus configured according to the present disclosure.

Referring now to FIG. 5, an exemplary embodiment of a network apparatus 500 capable of facilitating prioritized network connections with mobile devices is illustrated. As used herein, the term "network apparatus" includes, but is not limited to, network servers, macrocells, microcells, femtocells, picocells, wireless access points, or any combinations of the foregoing. While a specific device configuration and layout is shown and discussed, it is recognized that many other configurations may be readily implemented by one of ordinary skill given the present disclosure, the apparatus 500 of FIG. 5 being merely illustrative of the broader principles of the disclosure.

The processing subsystem 502 includes one or more of central processing units (CPU) or digital processors, such as a microprocessor, digital signal processor, field-programmable gate array, RISC core, or plurality of processing components mounted on one or more substrates. The processing subsystem is coupled to non-transitory computer-readable storage media such as memory 504, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM. The processing subsystem may also include additional co-processors. As shown, the processing subsystem 502 includes discrete components; however, it is understood that in some embodiments they may be consolidated or fashioned in a SoC (system-on-chip) configuration.

The apparatus 500 further includes one or more wireless interfaces 506 which are configured to receive/send transmissions from/to mobile devices (including connection request responses). A plurality of wireline "back end" interfaces 508 are also provided for communication with other network entities, such as for example an Ethernet (10/100/1000/10,000 Mbps) interface, or optical interface. Other interfaces may be used for such back-end communications, including for instance IEEE Std. 1394, Thunderbolt, Wi-Fi, WiMAX (IEEE Std. 802.16), and so forth.

In one exemplary embodiment, the non-transitory computer-readable storage media of the apparatus 500 includes instructions which when executed by the processor, sequence and prioritize one or more data packets, transmit the data packets via a heterogeneous network according to the sequence and prioritization for each packet. The storage media 504 further includes instructions which, when executed by the processor, receive a notification from the mobile device via the at least one wireless interface, the notification comprising at least a desired prioritized network connection setting determine based at least in part on the desired prioritized network connection setting, and based at least in part on the determination, adjust one or more parameters relating to scheduled communication with the mobile device.

Accordingly, in one variant of the disclosure, the adjustment of one or more parameters comprises at least modifying an amount of scheduled maintenance operations with the UE 400 between the network apparatus 500. Accordingly, the network apparatus 500 can schedule fewer time periods for that a UE 400 will need to perform a tune-away from another network connection (e.g. LTE) to perform maintenance operations on the network connection (e.g. CDMA 1x) with the network apparatus 500.

It will be recognized that while certain embodiments of the disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure.

While the above detailed description has shown, described, and pointed out novel features of the principles encompassed herein, it will be understood that various omissions, substitutions, and changes in the form and details of the device or process illustrated may be made by those skilled in the art without departing from the disclosure. The foregoing description is of the best mode presently contemplated. This description is in no way meant to be limiting, but rather should be taken as illustrative of the general principles. The scope of the disclosure should be determined with reference to the claims.

What is claimed is:

1. A method for prioritizing connections between a mobile device and two or more networks, the method comprising:
at the mobile device:
monitoring a parameter indicative of a preferred connection setting between the mobile device and the two or more networks;
determining based on the parameter when a change is indicated;
updating the preferred connection setting based at least in part on the determination; and
notifying at least one of the two or more networks of the updated preferred connection setting,
wherein notification to the at least one of the two or more networks comprises a request to adjust a quantity of scheduled network maintenance operations for the mobile device.

2. The method of claim 1, wherein the mobile device modifies one or more connections between the mobile device and the two or more networks based at least in part on the updated preferred connection setting.

3. The method of claim 2, wherein the mobile device modifies the one or more connections between the mobile device and the two or more networks by enabling or disabling at least one of the one or more connections of between the mobile device and the two or more networks.

4. The method of claim 1, wherein the scheduled network maintenance operations include one or more actions to listen for paging messages from a network of the two or more networks.

5. The method of claim 1, wherein the scheduled network maintenance operations include one or more actions to register or maintain registration with a network of the two or more networks.

6. A mobile device having preferred connection management, the mobile device comprising:
a processor;
two or more wireless interfaces in data communication with the processor; and
logic in data communication with the processor and the two or more wireless interfaces, the logic configured to cause the mobile device to:
monitor one or more operational conditions of the mobile device;

detect a change in the one or more operational conditions;
determine when to change a connection configuration of at least one of the two or more wireless interfaces based at least in part on the detected change in the one or more operational conditions;
update the connection configuration based at least in part on the determination; and
notify a network in communication with the mobile device of the updated connection configuration using at least one of the two or more wireless interfaces,
wherein:
the one or more operational conditions comprises execution and termination of applications resident on the mobile device,
the mobile device determines when to change the connection configuration based at least in part on a type of one or more services currently running on the mobile device, and
the mobile device notifies the network by at least requesting adjustment of a quantity of scheduled communications between the network and the mobile device.

7. The mobile device of claim 6, wherein the updated connection configuration is configured to enable or disable a connection between the mobile device and a network, the connection using at least one of the at least two or more wireless interfaces.

8. The mobile device of claim 6, wherein the mobile device updates the connection configuration based on one or more preferred network settings of an application when the application initializes on the mobile device.

9. A network apparatus configured to prioritize network connections with mobile devices, the network apparatus comprising:
a processor;
at least one wireless interface in data communication with the processor; and
logic in data communication with the processor and the at least one wireless interface, the logic configured to cause the network apparatus to:
receive a notification from a mobile device via the at least one wireless interface, the notification comprising at least a desired prioritized network connection setting;
determine based at least in part on the desired prioritized network connection setting when to adjust one or more parameters relating to scheduled communication with the mobile device; and
based at least in part on the determination, adjust the one or more parameters relating to scheduled communication with the mobile device,
wherein adjustment of the one or more parameters comprises at least modifying an amount of scheduled maintenance operations for the mobile device.

10. A mobile device having preferred connection management, the mobile device comprising:
a processor;
two or more wireless interfaces in data communication with the processor; and
logic in data communication with the processor and the two or more wireless interfaces, the logic configured to cause the mobile device to:
monitor one or more operational conditions of the mobile device;
detect a change in the one or more operational conditions;
determine when to change a connection configuration of at least one of the two or more wireless interfaces based at least in part on the detected change in the one or more operational conditions; and
update the connection configuration based at least in part on the determination,
wherein:
the one or more operational conditions comprises execution and termination of applications resident on the mobile device,
the mobile device determines when to change the connection configuration based at least in part on a type of one or more services currently running on the mobile device,
at least one application on the mobile device includes an indicator for a preferred network mode setting, and
the mobile device updates the connection configuration based at least in part on the indicator for the at least one application.

11. The mobile device of claim 10, wherein the indicator for the preferred network mode setting of the at least one application comprises a user selectable setting for a user of the mobile device.

12. A mobile device having preferred connection management, the mobile device comprising:
a processor;
two or more wireless interfaces in data communication with the processor; and
logic in data communication with the processor and the two or more wireless interfaces, the logic configured to cause the mobile device to:
monitor one or more operational conditions of the mobile device;
detect a change in the one or more operational conditions;
determine when to change a connection configuration of at least one of the two or more wireless interfaces based at least in part on the detected change in the one or more operational conditions; and
update the connection configuration based at least in part on the determination,
wherein:
the one or more operational conditions comprises execution and termination of applications resident on the mobile device,
the mobile device determines when to change the connection configuration based at least in part on a type of one or more services currently running on the mobile device, and
the mobile device updates the connection configuration based on one or more preferred network settings of one or more applications running on the mobile device when at least one application of the one or more applications initializes or terminates on the mobile device.

13. The mobile device of claim 12, wherein the one or more preferred network settings of the one or more applications comprises a preferred data traffic mode (PDTM) setting that indicates prioritizes data traffic connections over voice traffic connections for the mobile device.

14. A mobile device having preferred connection management, the mobile device comprising:
a processor;
two or more wireless interfaces in data communication with the processor; and logic in data communication with the processor and the two or more wireless interfaces, the logic configured to cause the mobile device to:
  monitor one or more operational conditions of the mobile device;
  detect a change in the one or more operational conditions;
  determine when to change a connection configuration of at least one of the two or more wireless interfaces based at least in part on the detected change in the one or more operational conditions; and
  update the connection configuration based at least in part on the determination, wherein the one or more operational conditions comprise execution and termination of applications resident on the mobile device, wherein the mobile device updates the connection configuration of the at least one of the two or more wireless interfaces based on one or more preferred network settings of an application when the application initializes on the mobile device, wherein the one or more preferred network settings of the application comprise a preferred data traffic mode (PDTM) setting that indicates a prioritization of data traffic connections over voice traffic connections for the mobile device.

* * * * *